July 15, 1930.                G. K. CALHOUN                1,770,657
WATER DISTRIBUTING SYSTEM FOR COOLING TOWERS
Filed April 2, 1928
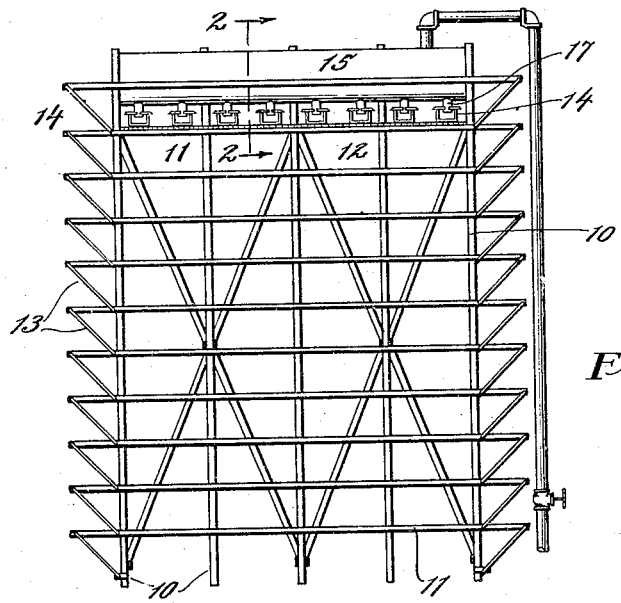
Fig. 1.
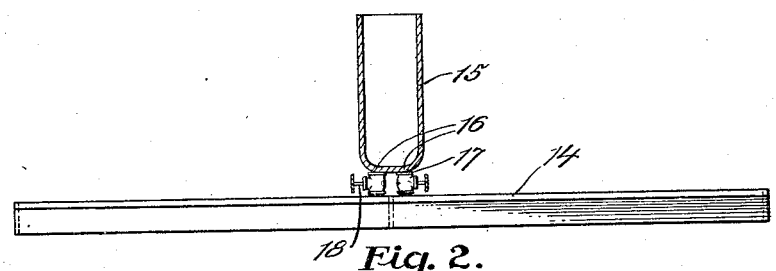
Fig. 2.
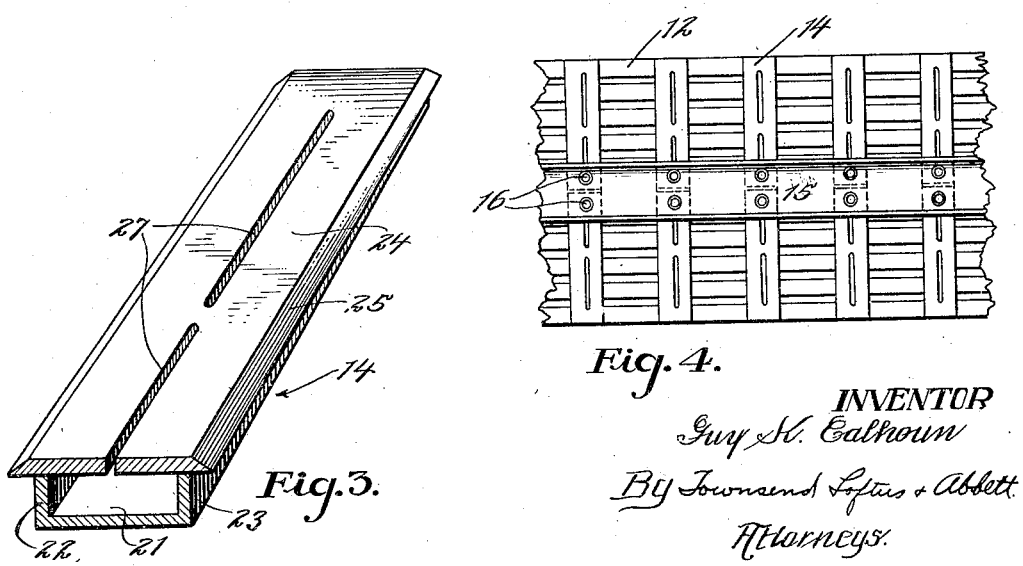
Fig. 3.
Fig. 4.
INVENTOR
Guy K. Calhoun
By Townsend, Loftus & Abbett
Attorneys.

Patented July 15, 1930

1,770,657

UNITED STATES PATENT OFFICE

GUY K. CALHOUN, OF LOS ANGELES, CALIFORNIA, ASSIGNOR TO C. F. BRAUN & CO., OF ALHAMBRA, CALIFORNIA

WATER-DISTRIBUTING SYSTEM FOR COOLING TOWERS

Application filed April 2, 1928. Serial No. 266,825.

This invention relates to water cooling towers of the atmospheric type and pertains to means for distributing and controlling the flow of water through the tower.

In water cooling towers of the atmospheric type it is common practice to provide a superstructure carrying a plurality of superposed horizontal decks spaced in relation to each other. These decks act mechanically to provide the water to be cooled into a plurality of minute streams which fall from deck to deck and are aerated in their fall. The decks also provide a desirable area of wetted surface by which the cooling action of the water is facilitated, in view of the fact, however, that the water can not be supplied to the tower in a uniform quantity it often occurs that under minimum conditions of flow the water is not adequately and evenly distributed over the horizontal area of the tower, resulting in a marked detrimental decrease in efficiency, and it is the principal object of the present invention to provide a distributing system for the hot water delivered to the tower, whereby it will be constantly and evenly distributed over the horizontal area of the cooling tower irrespective of the variation in inflow rate, thus insuring that at all times a uniform column comprising finely divided falling particles of water, will be created and maintained within the tower.

The present invention contemplates the provision of a flume mounted upon the tower, and supplying a plurality of distributing troughs with water from a variable supply. Said flume being designed to create a hydrostatic head at all times proportionate to the volume of water supplied, establishing a definite minimum head for a predetermined minimum water supply in the flume and increasing the pressure and velocity flow, without the change or adjustment of valves, etc., as supply conditions vary, at the same time providing means for preventing detrimental accumulation of algae and other microscopic animal life propagated in open bodies of water, within the distributing troughs.

The invention is illustrated by way of example in the accompanying drawing in which:

Fig. 1 is a view in vertical section and elevation showing a cooling tower of the conventional type, and indicating the application of the present invention thereto.

Fig. 2 is an enlarged view in section and elevation as seen on the line 2—2 of Fig. 1.

Fig. 3 is an enlarged perspective view of a fragmentary portion of one of the distributing troughs, showing the novel features of its construction.

Fig. 4 is a view in plan showing the arrangement of the water distributing system.

Referring more particularly to the drawing, 10 indicates uprights forming a part of the superstructure of a cooling tower. These uprights carry horizontally disposed deck support beams 11, upon which are mounted a plurality of spaced parallel deck slats 12. The slats in adjacent decks being staggered with relation to each other.

It is desirable to mount inclined louvers 13 around the decks to protect the falling column of water from the action of transversely moving air currents.

Mounted above the uppermost deck is a plurality of distributing troughs 14, which extend at right angles to the slats 12, and receive their supply of water from a flume 15, disposed above them, and extending at right angles to them.

It has been common practice in the construction of flumes for atmospheric cooling towers to build flumes which were relatively narrow and shallow. This has resulted in the creation of a body of water therein of small sectional area with a result that the water has flowed rapidly through the flumes and across the outlet openings and has not been equally distributed to the troughs 15. The present invention recognizes the fact that while the supply of water to the tower is not constant it is desirable to maintain an adequate minimum volume of water within the tower in order to insure that it will be uniformly distributed throughout the horizontal area of the tower irrespective of variation in the delivery of water thereto above a predetermined minimum water supply.

The flume 15 is constructed as shown in Fig. 2 of the drawing, of relatively narrow width and great depth. The result is that an accumulation of water takes place in the flume forming a body of water of large sectional area, which insures that the water will flow through the flume slowly and will be uniformly distributed to all of the outlet openings 16, leading therefrom since the water in the flume will not flow rapidly across said outlet openings without flowing downwardly therethrough. It will also be recognized that the depth of the flume makes possible a variable hydrostatic head, making it possible to establish a minimum hydrostatic head while accommodating variation in supply of water above a predetermined minimum water supply. This water passes through the opening 16 and the connecting ducts 17, and may pass through the valves 18 interposed in said ducts. These valves may be regulated to establish a minimum head within the flume and a direct ratio between the hydrostatic head of water in the flume and the volume of water flowing through the tower without further adjustment.

It will be readily recognized that after experimentation, the ducts 17 may be designed with a definite cross-sectional area so that the valves may be eliminated and a minimum head established.

The flume 15, as clearly shown in Fig. 2, has two outlet openings 16 in its bottom, by which ducts 17 establish communication with right and left sections of the distributing troughs 14. These troughs, as shown in Fig. 3, are formed with a floor 21 and side walls 22 and 23, forming a trough of rectangular shape, although it will be understood that other sections might be adapted if desired.

Mounted upon the trough and completely covering the same is a cover-board 24. This board has overhanging edges 25, the upper faces of which are beveled to a thin edge to provide an inclined surface over which the water may flow and from which edge the water may fall in a thin uniform stream. The cover-board 24 is formed with one or more openings 27, preferably along the longitudinal center line of the board. These openings are here shown as elongated slots through which the water may percolate from the trough and will thereafter be uniformly distributed over the cover-board to flow outwardly and downwardly over the sides thereof.

It will thus be evident that by covering the troughs, connecting the closed troughs with the improved flume here disclosed, and regulating or determining the effective sectional area of the ducts 17 to create a desired hydrostatic head of the water in the flume and at all times insure sufficient minimum pressure and volume of water in the distributing troughs, the water will flow out from the openings 27 of the cover-boards 24 in a volume and pressure proportional to the hydrostatic head of water in the flume.

By the arrangement of slotted cover-board 24 here shown it is also possible to materially prevent the accumulation of algæ and other such growth in the troughs, and to prevent the troughs from being attacked by microscopic life or injured by the effects of the elements. It will also be apparent that in the event that there is an accumulation of any material in the slots 27, that they may be readily cleaned by projecting some suitable instrument into the slots and drawing it therealong. Attention is further directed to the fact that the cover-board 24 is of materially greater width than the width of the trough, thus providing a large amount of desirable wetted surface over which the water may flow and be cooled, and insuring that the water from the jets spouting up through the openings 27 will fall at all times on the board 24 and thereafter flow over the edges thereof.

It will thus be seen that by the improvements here disclosed, more efficient operation of a cooling tower may be brought about due to the fact that adjustment is not necessary to accommodate a variable delivery flow of water to the tower while insuring a uniform distribution of water through the tower at all times, irrespective of its volume of delivery above a predetermined minimum supply of water, and that the distributing system will be protected from and easily rid of the detrimental effects of an accumulation of algæ and other microscopic vegetable and animal life.

While I have shown the preferred form of my invention as now known to me, it will be understood that various changes may be made in the combination, construction and arrangement of parts by those skilled in the art, without departing from the spirit of the invention as claimed.

Having thus described my invention, what I claim and desire to secure by Letters Patent is—

1. A distributing trough having an imperforate floor and side walls and a cover having elongated slots through which water may percolate from the trough, said cover having beveled overhanging edges, over which the water from the trough may flow and over which the water may fall.

2. A distributing trough comprising an imperforate floor and side walls, a perforate cover of relatively great width forming a large horizontal surface and overhanging lips along the opposite upper edges of the side walls and over which water from the trough may flow, said lips being beveled outwardly and downwardly to a relatively thin edge.

3. A distributing trough having an imperforate floor and side walls and a cover therefor, the opposite marginal edges of which overhang the sides of the trough, said cover being formed with perforations through which water from within the trough may percolate and then flow outwardly over the upper surface of the trough and then downwardly over the overhanging edges of the trough.

4. A distributing trough having an imperforate floor and side walls and a cover therefor, the opposite marginal edges of which overhang the sides of the trough, said cover being formed with perforations through which water from within the trough may percolate and then flow outwardly over the upper surface of the trough and then downwardly over the overhanging edges of the trough and said overhanging edges being beveled outwardly and downwardly to a relatively thin edge.

5. In combination with a distributing trough having an imperforate floor and side walls and a cover therefor, the opposite marginal edges of which overhang the sides of the trough, said cover being formed with perforations through which water from within the trough flows and then moves outwardly over the upper surface of the trough and then downwardly over the overhanging edges of the trough, means to maintain a minimum hydrostatic pressure in said trough, said means comprising an open receiver having unequal transverse sectional dimensions and valved conduits joining said receiver and said trough.

GUY K. CALHOUN.